May 19, 1959

H. C. FUNK 2,887,199

REVERSING CLUTCH ASSEMBLY

Filed July 26, 1956

INVENTOR.
H. C. Funk
BY
ATTORNEY

INVENTOR.
H. C. Funk

May 19, 1959 H. C. FUNK 2,887,199
REVERSING CLUTCH ASSEMBLY
Filed July 26, 1956 5 Sheets-Sheet 3

INVENTOR.
H.C. Funk
BY
ATTORNEY

May 19, 1959      H. C. FUNK      2,887,199
REVERSING CLUTCH ASSEMBLY

Filed July 26, 1956      5 Sheets-Sheet 4

INVENTOR.
H. C. Funk
BY
ATTORNEY

May 19, 1959     H. C. FUNK     2,887,199
REVERSING CLUTCH ASSEMBLY

Filed July 26, 1956     5 Sheets-Sheet 5

INVENTOR.
H.C. Funk
BY
ATTORNEY

United States Patent Office 2,887,199
Patented May 19, 1959

2,887,199

REVERSING CLUTCH ASSEMBLY

Howard C. Funk, Coffeyville, Kans., assignor to Funk Aircraft Company, Coffeyville, Kans., a corporation of Oklahoma Application July 26, 1956, Serial No. 600,190

8 Claims. (Cl. 192—.098)

This invention relates to a reversing clutch assembly and more particularly, but not by way of limitation, to a hydraulically controlled reversing clutch mechanism and a control lever assembly therefor.

The present invention contemplates a novel double clutch assembly comprising a forward clutch member and a reverse clutch member suitably geared to the engine of a vehicle for providing forward and reverse directions of movement to the vehicle. A hydraulic valve member is provided for the clutch assembly, and is in communication with each of the clutch members in such a manner that hydraulic fluid is alternately supplied to the forward and reverse clutches for a separate actuation thereof. The flow of hydraulic fluid from the valve member is controlled by the reciprocation of the valve piston within the valve body. Thus, in one position of the piston member, fluid is supplied only to the forward clutch for actuation thereof, and in another position of the piston member, fluid is supplied only to the reverse clutch member.

The piston member is reciprocated within the valve body by a control lever assembly which is actuated by means of a suitable hand operated throttle member or foot accelerator pedal member. The operation of the clutch assembly is controlled solely by the action of the throttle or accelerator member. A forward motion of the throttle or accelerator results in an engagement of the forward clutch member, and similarly a rearward motion of the throttle engages the reverse clutch member. Thus, the operation of the clutch assembly is greatly simplified by the direct co-action between the throttle member and the individual clutch members of the clutch assembly.

The novel clutch assembly is so designed and constructed that either the forward or reverse clutch member may be engaged while the engine is at idling speed, thereby greatly increasing the efficient life of the clutch members. Furthermore, the shifting of gears between a forward direction and a reverse direction of the clutch assembly is completely eliminated. Thus, the time required for depressing a clutch pedal is eliminated. The operation of the double clutch assembly is therefore of a greatly increased efficiency.

It is an important object of this invention to provide a hydraulically actuated double clutch assembly which provides alternate forward and reverse motion for the vehicle associated with the clutch assembly.

It is another object of this invention to provide a hydraulically actuated double clutch assembly which provides alternate forward and reverse rotation of the output shaft thereof without a shifting of gears between the forward drive and reverse drive.

And still another object of this invention is to provide a clutch assembly which is actuated solely by the operation of a throttle lever or accelerator pedal.

A further object of this invention is to provide a novel reversing clutch assembly wherein there is a direct co-action between the clutch members and the throttle control lever thereby greatly simplifying the operation of the clutch mechanism.

A still further object of this invention is to provide a control linkage assembly for a reverse clutching mechanism which is so constructed and designed to permit engagement of either the forward or reverse clutch member when the engine is at idling speed.

And a further object of this invention is to provide a novel reversing clutch assembly which is of increased efficiency and simplicity in operation, and durable and economical in construction.

Other objects and advantages of the invention will be evident from the following detailed description, read in conjunction with the accompanying drawings, which illustrate my invention.

Figure 1:
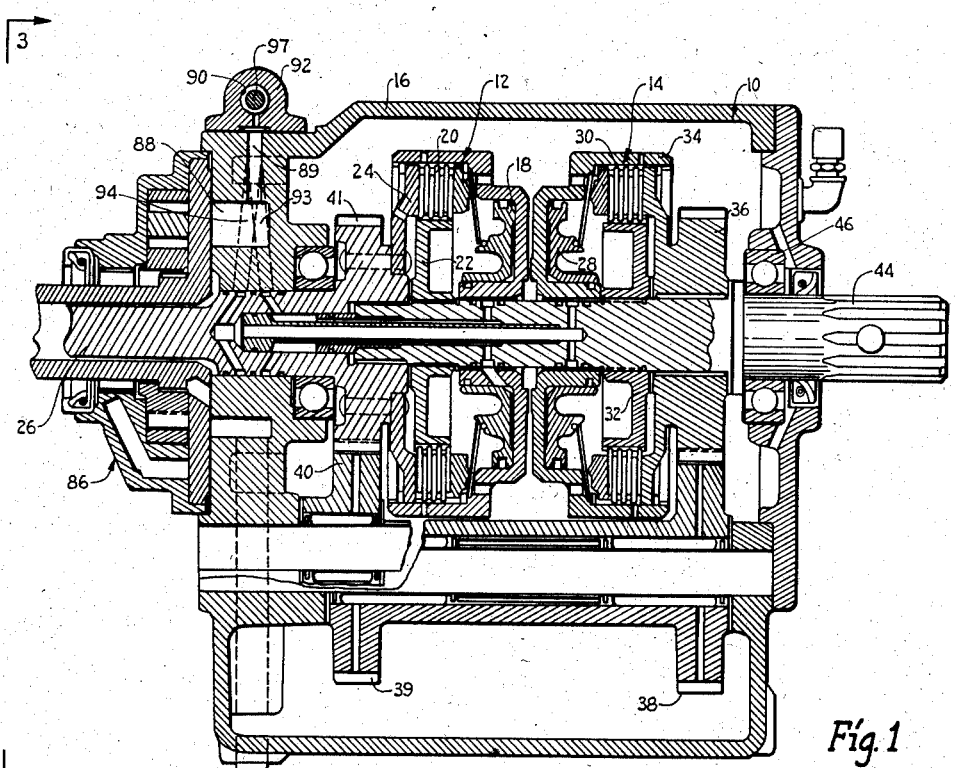
Figure 1 is a sectional elevational view of a reversing clutch assembly embodying the invention.

Referring to the drawings in detail, reference character 10 refers in general to a reversing clutch assembly comprising a forward clutch member 12 and a reverse clutch member 14 encased within a suitable housing 16. The clutch members 12 and 14 are preferably suitable hydraulically actuated clutch members such as shown herein. The forward clutch 12 may be provided with a movable piston member 18 which moves the clutch plates 20 alternately into and out of engagement as will be hereinafter set forth. The hub member 22 of the clutch 12 rotates only upon an engagement of the clutch plates 20. The element 24 of the clutch 12 is preferably integral with a rotatable input shaft 26 and rotates simultaneously therewith. In a similar manner, the reverse clutch 14 is provided with a movable piston member 28 for alternately engaging and disengaging the clutch plates 30. The hub 32 rotates only when the clutch plates 30 are in engagement. The element 34 of the clutch member 14 is preferably integral with a gear 36 and rotates simultaneously therewith. The gear 36 is suitably geared through the gear members 38, 39, 40 and 41 in order to rotate in a reverse direction from the input shaft 26. The gear 41 is preferably integral with the input shaft and rotates simultaneously therewith. Thus, the element 34 of the reverse clutch 14 will always rotate in a reverse direction from that of the element 24 of the forward clutch member 12.

The input shaft 26 extends into the housing 16 and is provided with a bore 42 at the right end thereof as viewed in Fig. 1 for rotatably receiving an output shaft 44. The output shaft 44 is journalled within a suitable bearing member 46 which is spaced from the input shaft 26 and therefore the output shaft 44 rotates independently of the input shaft 26. The hub members 22 and 32 of the clutch members 12 and 14, respectively, are suitably keyed to the output shaft 44 to alternately transmit rotation thereto as will be hereinafter set forth.

Figure 2:
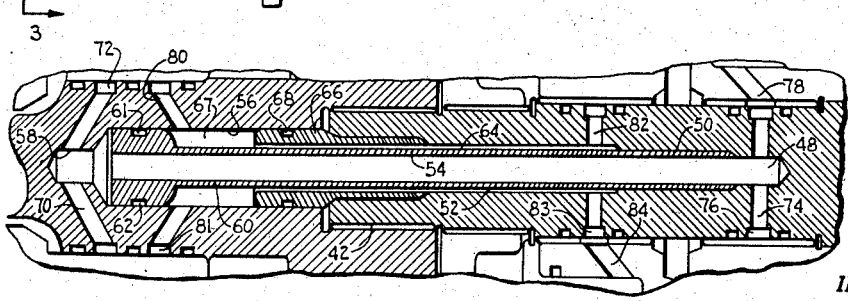
Figure 2 is an enlarged detail view of a portion of the clutch assembly shown in Fig. 1.

A bore 48 is provided in the output shaft 44 in communication with the bore 42 of the input shaft 26. The bore 48 is enlarged in sequence at 50, 52 and 54. The bore 42 of the input shaft 36 is of a slightly decreased diameter in sequence at 56 and 58. A sleeve member 60 is disposed in the bore 56 and extends longitudinally into the bore 50 of the shaft 44 as clearly shown in Fig. 2. The internal diameter of the sleeve 60 is substantially the same diameter as the bores 58 and 48, thereby providing a continuous passageway therebetween. The sleeve 60 is enlarged at one end 61 for receiving a suitable sealing ring member 62 to preclude leakage of fluid therearound. Thus, any fluid which may enter the bore 58 will flow through the sleeve 60 into the bore 48.

A second sleeve member 64 is loosely disposed around the sleeve member 60 and extends from the bore 56 into the bore 54. The sleeve 64 is slightly enlarged at 66 and is spaced from the member 61 to provide a chamber 67 therebetween. A suitable sealing member 68 is provided on the member 66 for precluding the leakage of fluid therearound. The internal diameter of the second sleeve member 64 is substantially the same as the diameter of the bore 52 thereby providing a continuous passageway from the chamber 67 to the bore 52, as clearly shown in Fig. 2. Thus, any fluid which may enter the chamber 67 will flow the sleeve 64 and into the bore 52 of the output shaft 44.

A plurality of substantially radial bores 70 extend from the bore 58 to an annular groove 72 provided on the outer periphery of the input shaft 26. A plurality of radial bores 74 extend from the bore 58 to an annular groove 76 on the outer periphery of the output shaft 44. The annular groove 76 is in communication with an angularly disposed bore 78 which in turn communicates with the left hand side of the piston 28 of the reverse clutch 14 as viewed in Fig. 1. Thus, any fluid pressure which may be injected into the bores 70 will flow through the sleeve 60 for discharge through the port 78 to act upon the piston 28. The fluid pressure on the left hand side of the piston 28 will move the piston in a right hand direction whereby the clutch plates 30 will be engaged. When the clutch plates 30 are in engagement, the hub member 32 will rotate simultaneously with the element 34, and thus transmit rotation to the output shaft 44. As hereinbefore set forth, the element 34 rotates in a reverse direction from the input shaft 26, and thereby the rotation of the shaft 44 will be in a reverse direction upon engagement of the reverse clutch 14.

In a similar manner, a plurality of substantially radial bores 80 extend from the chamber 67 to an annular groove 81 on the outer periphery of the input shaft 26, and a plurality of radial bores 82 extend from the bore 52 to an annular groove 83 provided on the outer periphery of the output shaft 44. The annular groove 83 is in communication with an angularly disposed bore 84 which in turn communicates with the right hand side of the piston 18 of the forward clutch 12 as viewed in Fig. 1. Any fluid pressure which may be injected into the bores 80 will flow through the sleeve 64 for discharge through the port 84 to the right hand side of the piston 18. This fluid pressure will move the piston 18 in a left hand direction to engage the clutch plates 20. The engagement of the clutch plates 20 causes the hub member 22 to rotate simultaneously with the element 24 and transmit this rotation to the output shaft 44. As hereinbefore set forth, the element 24 rotates simultaneously and in the same direction as the input shaft 26, therefore the rotation of the output shaft will be in a forward direction upon actuation of the forward clutch member 12. It will be apparent that suitable sealing ring members are provided within the clutch assembly to provide for an efficient flow of fluid to the clutch members 12 and 14.

Figure 3:
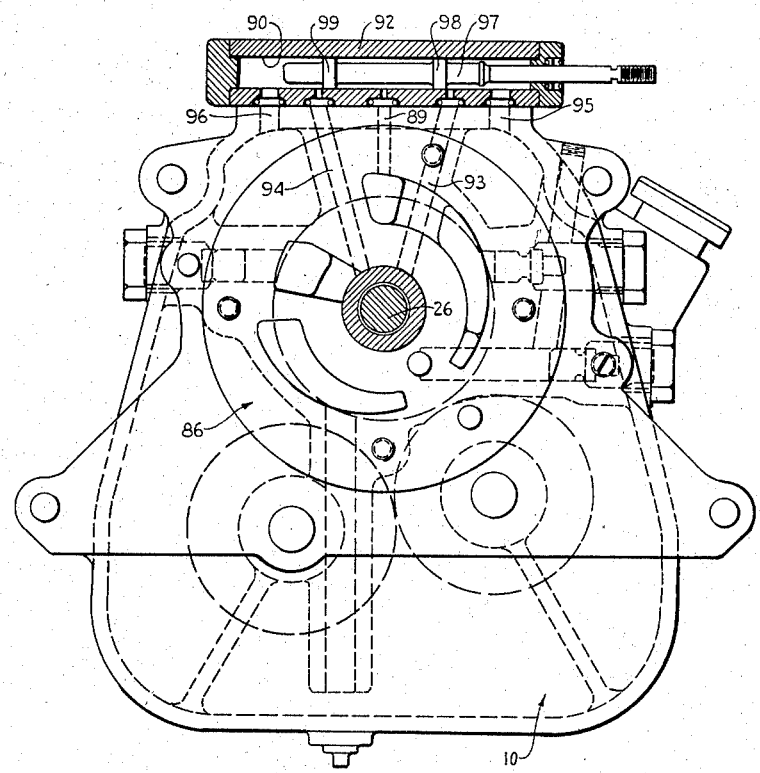
Figure 3 is a view partly in section taken on line 3—3 of Fig. 1.

A suitable pump assembly, generally indicated at 86 is secured to the exterior of the housing 16 around the input shaft 26 for providing an adequate supply of hydraulic fluid (not shown) to a fluid chamber 88. A passageway 89 provides communication between the chamber 88 and the longitudinal bore 90 of a two-way valve 92 (see also Fig. 3). Thus the pump 86 supplies a flow of hydraulic fluid to the valve 92. A passageway 93 directs the hydraulic fluid from the bore 90 to the annular groove 81 of the input shaft 26, and a similar passageway 94 directs the hydraulic fluid from the bore 90 to the annular groove 72 of the input shaft 26. A pair of bores 95 and 96 are provided at the opposite ends of the bore 90 to direct hydraulic fluid back into the pump 86 for recirculation throughout the system in any well known manner. A piston member 97 is reciprocally disposed within the bore 90 and is provided with spaced head members 98 and 99. When the head members 98 and 99 are centrally disposed within the bore 90 as shown in Fig. 3, the fluid from the passageway 89 is retained therebetween and cannot enter either of the bores 93 or 94. It will be apparent that a right hand movement of the piston 97 as viewed in Fig. 3 will provide communication between the passageways 89 and 94. Similarly, a left hand movement of the piston 97 will provide communication between the passageways 89 and 93. Thus, actuation of the piston member 97 alternately provides hydraulic fluid to the forward clutch member 12 and reverse clutch member 14 for actuation thereof.

Figure 5:
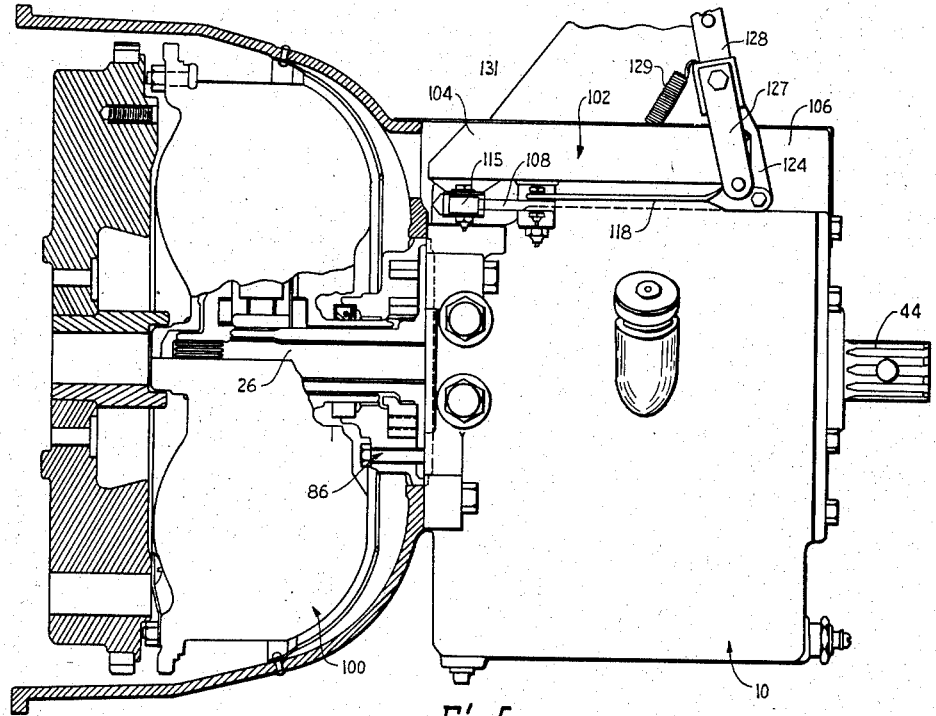
Figure 5 is a plan view, partially in section, of the novel clutch mechanism and the engine and lever control assembly therewith.

The input shaft 26 is rotated about its axis by a suitable engine 100 (Fig. 5), or the like, in any well known manner, and always rotates in one direction only. As hereinbefore set forth, the forward clutch element 24 is preferably integral with the shaft 26 and always rotates simultaneously therewith, and in the same rotational direction. The gear member 41 is also integral with the shaft 26 and therefore always rotates simultaneously therewith. The gear train 41, 40, 39, 38 and 36 is thus always in actuation during the rotation of the input shaft 26, and provides a continuous reverse direction of rotation for the reverse clutch element 34 during rotation of the input shaft 26. The output shaft 44, however, is independent of the input shaft 26, and will rotate only when either the forward clutch 12, or the reverse clutch 14 is in engagement. When the valve piston 97 is positioned to provide hydraulic fluid to the forward clutch member 12, the engaged clutch plate members 20 cause the hub member 22 to rotate simultaneously with the clutch element 24. As hereinbefore set forth, the hub member 22 is keyed to the output shaft 44 and therefore transmits a direct rotation or forward direction of rotation from the input shaft 26 to the output shaft 44. When the piston 97 is positioned within the valve 92 for providing hydraulic fluid to the reverse clutch member 14, the engaged clutch plate members 30 cause the hub member 32 to rotate simultaneously with the clutch element 34, and therefore transmit a reverse direction of rotation to the output shaft 44.

Figure 4:
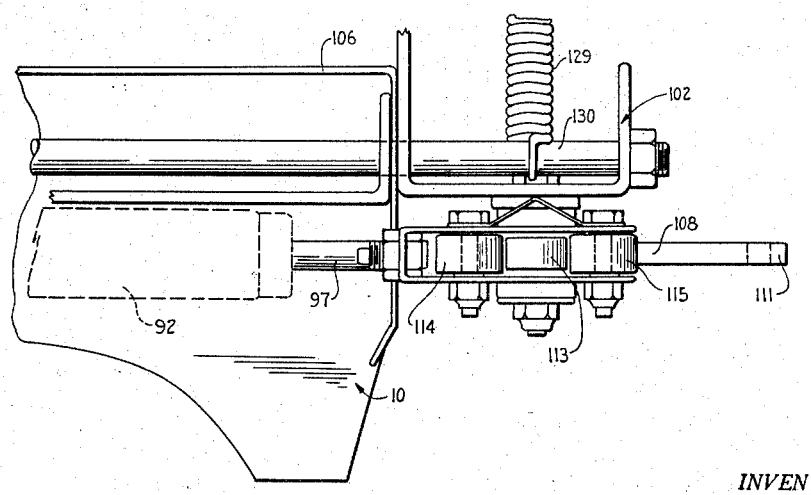
Figure 4 is an enlarged detail end view of the lever control mechanism secured to the valve piston rod.
Figure 6:
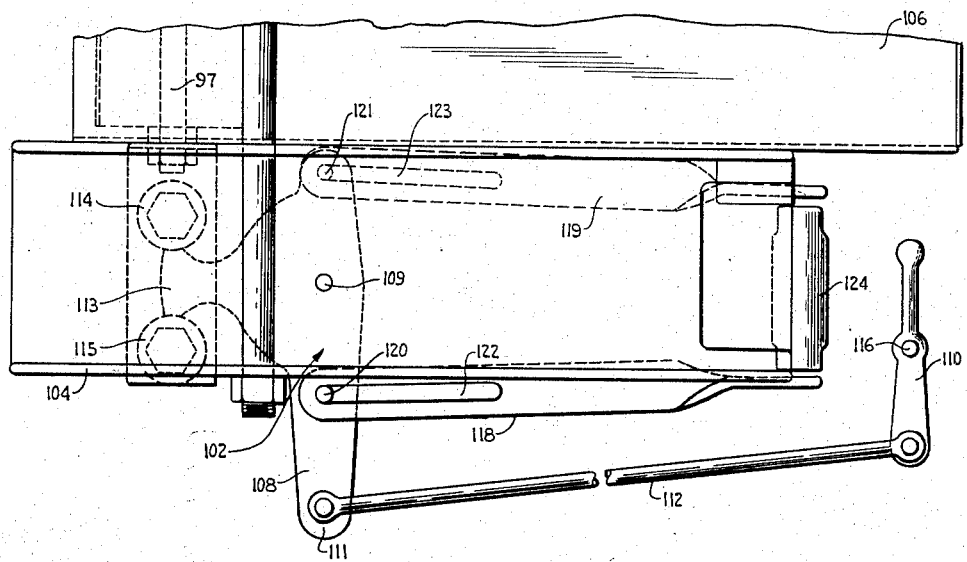
Figure 6 is a plan view of the lever control assembly with portions shown in dotted lines for clarity.

The valve piston member 97 is reciprocated within the valve 92 by a control lever or linkage assembly generally indicated at 102. The linkage assembly 102 is particularly shown in Figs. 6 through 9, and comprises a channel member 104 suitably secured to the clutch assembly 10 adjacent the valve 92 by means of a bracket member 106. A bell crank 108 is pivotally secured at 109 to the channel 102. A suitable hand lever throttle control member 110 (Fig. 6) or foot pedal (not shown) is connected to the outer extremity portion 111 of the bell crank 108 by a rod member 112 such that movement of the lever 110 will pivot the bell crank as will be hereinafter set forth. A tong member 113 is provided on the bell crank 108 and extends substantially perpendicular to the end portion 111. The tong member 113 is disposed between a pair of suitable roller members 114 and 115 which are in turn suitably secured to the piston rod 97 (Fig. 4). Thus, pivotal movement of the bell crank 108 causes the tong 113 to bear alternately against the rollers 114 and 115 whereby the rollers move in a horizontal plane to reciprocate the rod member 97 within the valve 92. The lever member 110 preferably moves pivotally about an axis pin 116 and is connected to the bell crank 108 in such a manner that a left hand or counter-clockwise movement of the lever 110, as viewed in Fig. 6, will move the bell crank 108 in a counterclockwise direction. Thus, the tong member 113 bears against the roller 115 to move the piston 97. Similarly, a clockwise rotation of the lever 110 causes a clockwise rotation of the bell crank 108 whereby the tong 113 bears against the roller 114 to move the piston 97.

Referring to Fig. 4, it will be apparent that the piston 97 is moved in a right hand direction when the tong 113 moves the roller 115. This right hand direction of reciprocation of the piston 97 permits the hydraulic fluid to enter the forward clutch 12 for actuation thereof as hereinbefore set forth. The piston 97 will be moved in a left hand direction when the tong member 113 moves the roller 114, thereby permitting the hydraulic fluid to actuate the reverse clutch member 14. The operator (not shown) of the lever 110 normally is positioned with the lever 110 in front of him. Thus, as he manually moves the lever 110 in a direction away from himself, or in a forward direction, the forward clutch member is actuated, and when he pulls the lever 110 in a direction toward himself, or in a reverse direction, the reverse clutch is actuated. This direct co-action between hand lever 110 and the forward and reverse clutch members greatly simplifies the operation of the clutch assembly 10.

A pair of spaced link rod members 118 and 119 are slidably secured to the bell crank 108 by a pair of pin members 120 and 121 which ride in the longitudinal grooves 122 and 123, respectively. The pins 120 and 121 are diametrically opposed and spaced from the pivot pin 109 in order that rotation of the bell crank 108 will alternately move the link rod members 118 and 119. For example, a counter-clockwise rotation of the bell crank 108 (Fig. 6) will move the pin 121 toward the left end of the slot 123 and thereby moves the member 119 to the left, while the pin 120 rides freely toward the right in the slot 122. Similarly, a clockwise rotation of the bell crank 108 moves the pin 120 toward the left end of the slot 122 to move the link member 118 to the left while the pin 121 rides freely toward the right in the slot 123. The linkage members 118 and 119 are rigidly secured together at the outer or right hand extremities thereof by a suitable rocker member 124 so that the longitudinal movement of one of the link members is transmitted simultaneously to the other link rod. Thus, regardless of the direction of rotation of the bell crank 108, the link rods 118 and 119 move in the same direction.

Figure 7:
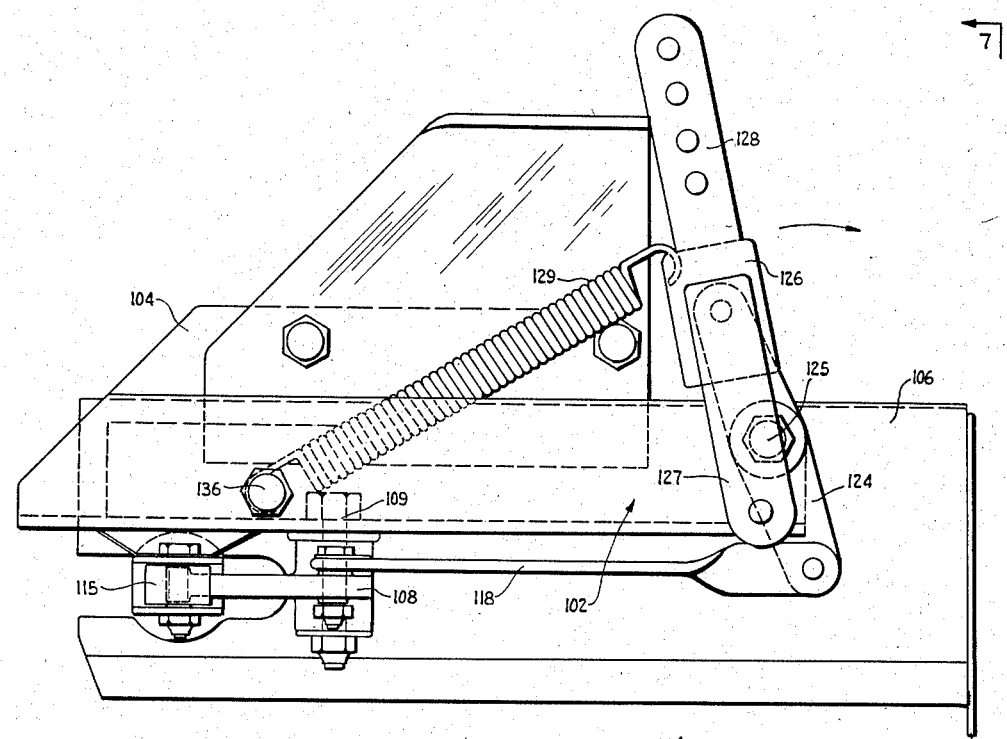
Figure 7 is a side elevational view of the control linkage assembly.
Figure 8:
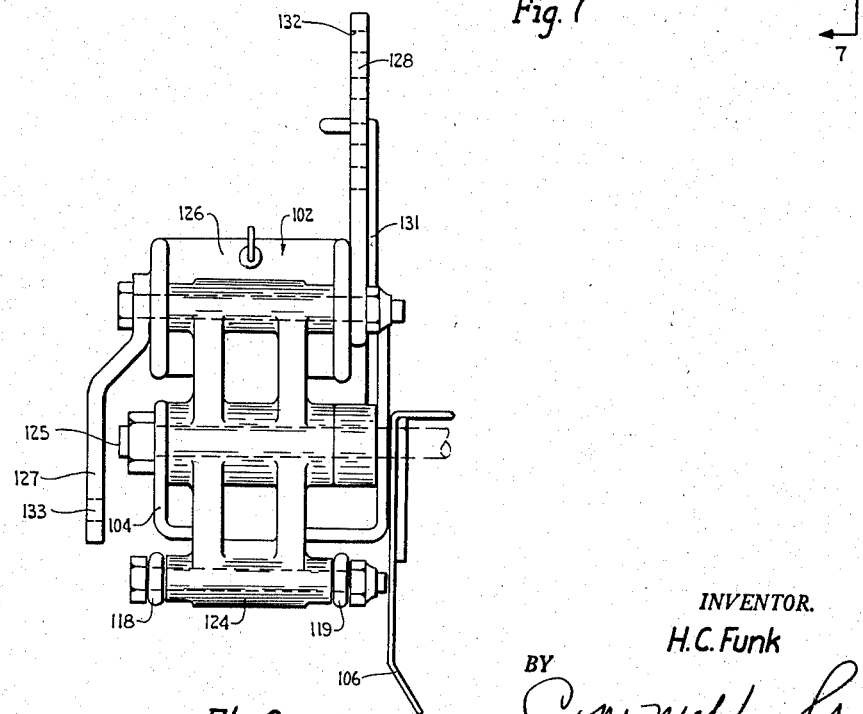
Figure 8 is a view taken on line 7—7 of Fig. 6.
Figure 9:
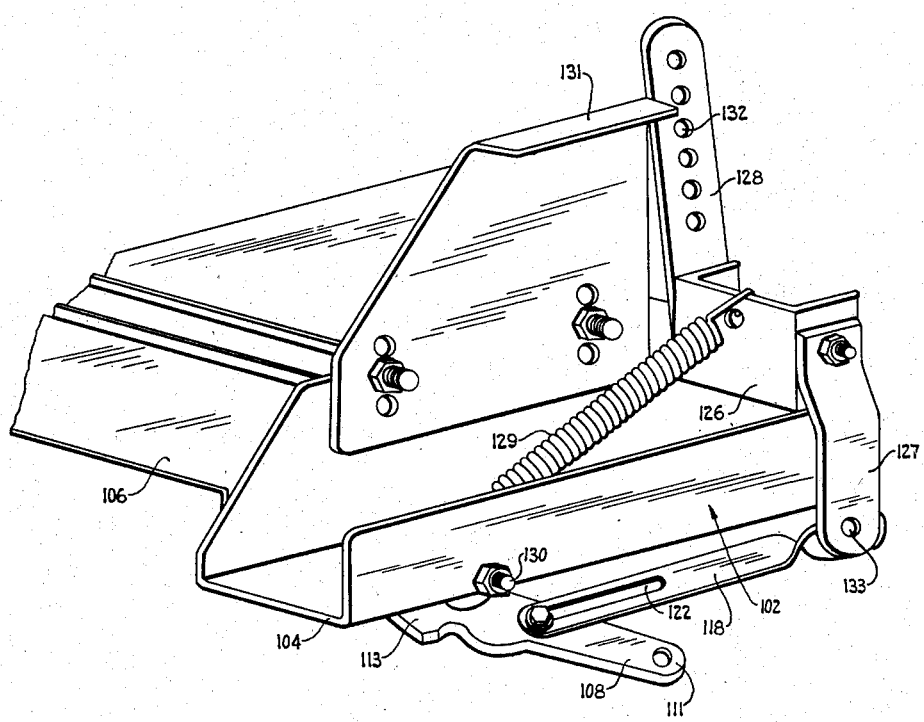
Figure 9 is a perspective view of the control linkage assembly.

The rocker member 124 is journalled about a suitable transverse pin member 125 (Fig. 8) and is rocked in a clockwise direction as shown by the arrow in Fig. 7 by the link rods 118 and 119 upon rotation of the bell crank 108. A bracket member 126 is suitably pivotally secured at the top of the rocker member 124 to receive a downwardly extending arm member 127 and an oppositely disposed upwardly extending arm member 128. A spring member 129 is anchored at one end of the bracket 126 and at the opposite end to a transverse pin member 130 to retain the arm member 128 adjacent a stop member 131 which is bolted or the like to the channel 104 for limiting the rotation of the arm member 128 in one direction. The spring member 129 tends to retain the rocker assembly 124 in the neutral position as shown in the drawings. A clockwise rotation of the rocker member 124 transmits a rotation to the arm members 127 and 128 in a clockwise direction and moves the arm member 128 in a direction away from the stop member 131. The arm members 127 and 128 may also be moved or rotated with the bracket member 126 independently from the rocker assembly 124 by exerting a force on either of the arm members 127 and 128.

The arm member 128 is provided with a plurality of spaced apertures 132 for receiving the linkage members (not shown) of a suitable carburetor (not shown), or the like. The carburetor is preferably in connection with the arm 128 in such a manner that the clockwise rotation of the arm 128 actuates the carburetor to supply fuel to the engine 100 in the usual manner for operation of the vehicle (not shown) associated therewith. Thus, the movement of the arm 128 controls the speed of the engine so that the greater the distance through which the arm 128 moves in a clockwise direction, the greater the speed of the engine. When the arm member 128 is in a rest position adjacent the stop member 131, the engine is at an idling speed. Furthermore, the bracket member 126 is pivotally secured to the rocker 124 in such a manner that a slight clockwise rotation of the rocker member occurs before the arm member 128 is moved from contact with the stop member 131, thereby providing for a better control of the acceleration of the engine 100.

The arm member 127 may be provided with a separate foot pedal or hand lever (not shown) for moving the arm 127 and connecting bracket 126 and arm 128 in a clockwise direction independently from the rocker mechanism 124, thereby permitting a speed up or acceleration of the engine when the clutch members are not actuated. It will be apparent that the control of the speed of the engine 100 is exactly the same regardless of the direction of rotation of the bell crank 108, and thus regardless of which clutch member is engaged.

Operation

In summary, the operation of the double clutch mechanism 10 will be readily apparent. The operator of the device controls the actuation of the clutching members and the speed of the engine solely by the operation of the hand lever, or foot pedal 110. When the operator manually moves the lever 110 in a direction away from himself, or in a forward direction, the bell crank 108 is rotated in a counter-clockwise direction as viewed in the drawings, whereupon the tong member 113 functions to move the piston member 97 within the valve 92 to a position for supplying hydraulic fluid to the forward clutch member 12. As long as the forward clutch member is engaged the output shaft 44 will rotate in a forward direction to transmit a forward motion to the vehicle in the normal manner well known in the art. The operator may control the engine speed by the amount of movement of the hand lever 110. The further forward the lever is moved, the further the bell crank member 108 is rotated to rock the rocker member 124. The rocker member controls the movement of arm member 128 which in turn controls the actuation of the carburetor for supplying fuel to the engine 100.

In order to provide a reverse motion for the vehicle, the operator merely pulls the lever 110 in a direction toward himself, or in a reverse direction, whereby the bell crank 108 is rotated in a clockwise direction. The clockwise direction of rotation of the bell crnak 108 moves the piston 97 within the valve 92 to a position for supplying hydraulic fluid to the reverse clutch mechanism 14 for actuation thereof. As long as the reverse clutch member is engaged, the output shaft 44 will rotate in a reverse direction for a reverse motion of the vehicle. The control of the speed of the engine 100 is exactly the same when the reverse clutch is engaged as when the forward clutch is engaged because the rocker assembly 124 functions exactly the same regardless of the direction of rotation of the bell crank 108. Thus, the engine 100 may be efficiently utilized for operation of the vehicle in either a forward or reverse direction of motion.

From the foregoing, it will be apparent that the present invention provides a novel double clutch assembly and control linkage member therefor which completely eliminates the shifting of gears between the engagement of the forward clutch member and reverse clutch member. The operator of the clutch assembly controls the operation thereof solely by the manual manipulation of a suitable hand throttle lever or foot pedal accelerator member. The engine speed is also controlled by the manual manipulation of the control lever member. A forward motion of the hand lever actuates the control linkage mechanism to reciprocate the piston member within the two-way valve to a position for supplying hydraulic fluid to the forward clutch member for actuation thereof. The linkage mechanism simultaneously functions to actuate the engine carburetor for supplying fuel to the engine in accordance with the desired engine speed. A release of the hand lever permits the spring action of the control linkage mechanism to position the valve piston within the valve in a manner to preclude the flow of hydraulic fluid to either the forward or reverse clutch member, thereby placing the engine in an idling speed. However, the control linkage member permits control of the engine speed independently of the engagement of the clutch members, thereby permitting a speed up of the engine accessories without an engagement of the clutch members. The novel double clutch assembly is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A reversing clutch assembly comprising a housing, a rotatable input shaft extending into the housing, an output shaft journalled within the housing and rotatable independent of the input shaft, a hydraulically actuated forward clutch member in the housing, a hydraulically actuated reverse clutch member in the housing, passageway means for directing hydraulic fluid alternately to the clutch members for actuation thereof, valve means for supplying the hydraulic fluid to the passageway means, a control linkage assembly for actuation of the valve means, said control linkage comprising a channel member secured to the housing, a bell crank pivotally secured to the channel member, a control lever secured to the bell crank for pivoting thereof for actuation of the valve means, and a rocker member connected to the bell crank through a lost motion connecting means for rotation thereby for controlling actuation of the clutch assembly.

2. A reversing clutch assembly comprising a housing, a rotatable input shaft extending into the housing, an output shaft journalled in the housing and rotatable independent of the input shaft, a hydraulically actuated forward clutch member within the housing adapted for direct rotation by the input shaft to transmit forward rotation to the output shaft, a hydraulically actuated reverse clutch member within the housing, a gear train within the housing to rotate the reverse clutch member in a reverse direction from the input shaft, said reverse clutch member adapted to transmit the reverse direction of rotation to the output shaft, means for providing hydraulic fluid for the clutch assembly, a passageway for directing the fluid to the forward clutch member, a second passageway for directing the fluid to the reverse clutch member, a valve member secured to the housing for alternately supplying the fluid to the passageways, a bell crank member adapted for actuation of the valve member, and a control lever member for actuation of the bell crank.

3. A reversing clutch assembly comprising a housing, a rotatable input shaft extending into the housing, an output shaft journalled in the housing and rotatable independent of the input shaft, a hydraulically actuated forward clutch member within the housing adapted for direct rotation by the input shaft to transmit forward rotation to the output shaft, a hydraulically actuated reverse clutch member within the housing, a gear train within the housing to rotate the reverse clutch member in a reverse direction from the input shaft, said reverse clutch member adapted to transmit the reverse direction of rotation to the output shaft, means for providing hydraulic fluid for the clutch assembly, a passageway for directing the fluid to the forward clutch member, a second passageway for directing the fluid to the reverse clutch member, a two-way valve secured to the housing and in communication with the passageways, a piston member reciprocally disposed within the valve to alternately provide a flow of fluid to the passageways, a pivotal bell crank member provided for reciprocation of the piston member, and a control lever for pivoting the bell crank.

4. A reversing clutch assembly for use with an engine, and comprising a housing, an input shaft extending into the housing and rotatable by the engine, an output shaft journalled in the housing and rotatable independent of the input shaft, a hydraulically actuated forward clutch member in the housing for transmitting a forward direction of rotation to the output shaft, a hydraulically actuated reverse clutch member in the housing for transmitting a reverse direction of rotation to the output shaft, a passageway for directing hydraulic fluid to the forward clutch member, a second passageway for directing hydraulic fluid to the reverse clutch member, a two-way valve in communication with the passageways, a reciprocable piston within the valve for alternately providing a flow of hydraulic fluid to the passageways, a control linkage assembly secured to the housing adjacent the valve, a bell crank pivotally secured on the control linkage assembly, a projection member provided on the bell crank adapted to contact a pair of roller members secured to the piston member whereby pivotal movement of the bell crank will reciprocate the piston within the valve, a rocker member provided on the control linkage assembly and rotated by the bell crank, said rocker member adapted to control the speed of the engine upon rotation of the rocker, and a control lever for controlling the pivotal movement of the bell crank.

5. A control lever assembly for a double clutch mechanism of an engine comprising a channel member secured to the clutch mechanism, a bell crank pivotally secured to the channel member, a control lever secured to the bell crank for pivoting thereof, a rocker member connected to the bell crank for rotation thereby, and an arm member secured to the rocker member and rotated thereby to control the speed of the engine.

6. In a double clutch assembly for an engine having a forward clutch member and a reverse clutch member, valve control means for alternate engagement of the clutch members, a control lever assembly for the clutch assembly, said control lever assembly comprising a channel member secured to the clutch assembly adjacent the valve means, a bell crank member pivotally secured to the channel and adapted to actuate the valve means, a rocker member connected to the bell crank and rotated by the pivotal movement of the bell crank, an arm member rotated by the rocker member for controlling the speed of the engine, and a control lever for pivoting the bell crank member.

7. In a reversing clutch assembly for utilization with an engine, an input shaft rotated by the engine, an output shaft rotatable independent of the input shaft, a hydraulically actuated forward clutch member adapted for direct rotation by the input shaft to transmit the direct rotation to the output shaft, a hydraulically actuated reverse clutch member adapted for indirect rotation by the input shaft to transmit a reverse direction of rotation to the output shaft, valve means for directing hydraulic fluid alternately to the clutch members for alternate actuation thereof, a control linkage assembly for the clutch assembly, a pivotal bell crank member provided on the linkage assembly and adapted to actuate the valve means, a rocker member connected to the bell crank and rotated by the pivotal movement of the bell crank, an arm member rotated by the rocker member and adapted to control the speed of the engine, and a control lever member for pivoting the bell crank member.

8. In a reversing clutch assembly for utilization with an engine, an input shaft rotated by the engine, a rotatable output shaft, a hydraulically actuated forward clutch member adapted to transmit a direct rotation from the input shaft to the output shaft, a hydraulically actuated reverse clutch member adapted to transmit a reverse direction of rotation from the input shaft to the output shaft, a passageway means for directing hydraulic fluid to the clutch members, means for circulating the hydraulic fluid in the clutch assembly, valve means for alternately directing the flow of the hydraulic fluid to the clutch members for alternate actuation thereof, a reciprocal piston member provided in the valve for controlling the flow of fluid through the valve means, a control linkage assembly for the reversing clutch assembly, a pivotal bell crank member provided on the control linkage assembly adapted to reciprocate the piston member, a rocker member provided on the control linkage, linkage members provided between the rocker member and the bell crank member for interconnection therebetween to transmit rotation to the rocker upon pivotal movement of the bell crank, an arm member rotated by the rocker member for controlling the speed of the engine, and a control lever for pivoting the bell crank.

References Cited in the file of this patent

UNITED STATES PATENTS

| | | |
|---|---|---|
| 2,396,231 | Brill | Mar. 12, 1946 |
| 2,419,906 | Mills | Apr. 29, 1947 |
| 2,438,216 | Jessen | Mar. 23, 1948 |
| 2,488,540 | Hollingsworth | Nov. 22, 1949 |